United States Patent [19]

Inoue et al.

[11] Patent Number: 4,510,192

[45] Date of Patent: Apr. 9, 1985

[54] SYNTHETIC LEATHER FOR MOTORCARS HAVING A GROUND FABRIC KNITTED BY A PLURALITY OF STROKES

[75] Inventors: Setsuro Inoue, Ichikawa; Koichi Nikaido; Makoto Nakagome, both of Tokyo, all of Japan

[73] Assignee: Yamato Chemical Industry Co. Ltd., Tokyo, Japan

[21] Appl. No.: 544,383

[22] Filed: Oct. 21, 1983

[30] Foreign Application Priority Data

Oct. 28, 1982 [JP] Japan .................... 57-163498

[51] Int. Cl.$^3$ .................................................. B32B 7/00
[52] U.S. Cl. .................................... 428/151; 428/253; 428/254; 428/904
[58] Field of Search ............... 428/151, 254, 904, 253

[56] References Cited

U.S. PATENT DOCUMENTS 3,687,715  8/1972  Kigane .................. 428/254
4,233,359 11/1980  Mimura ................. 428/254
4,241,124 12/1980  Kremer ................. 428/254

Primary Examiner—Marion E. McCamish
Attorney, Agent, or Firm—Martin Smolowitz

[57] ABSTRACT

The synthetic leather has high tensile strength and elongation which are well balanced in both transverse and longitudinal directions due to the use of a fabric knitted in a plurality of strokes as the base fabric bonded to a synthetic resin by means of an adhesive. Especially because elongation is well balanced in both directions, the synthetic leather can be used suitably as a leather for any object which is subjected to repeated heavy loads.

4 Claims, 3 Drawing Figures

SYNTHETIC LEATHER FOR MOTORCARS HAVING A GROUND FABRIC KNITTED BY A PLURALITY OF STROKES

BACKGROUND OF THE INVENTION

This invention relates to a synthetic resin leather for a motorcar and more particularly, to a leather for a motorcar having a construction in which the elongation ratio and tensile strength of warps are substantially equal to those of wefts.

Flexible leather of the kind described above has employed conventionally single stroke-knitted fabric of plain stitch and single stroke-knitted fabric of double stitch as the ground fabric. However, its elongation in the transverse direction is by far greater than elongation in the longitudinal direction, whereas tensile strength in the transverse direction is smaller than that in the longitudinal direction. Hence, the synthetic leather has directivity either in the transverse direction or in the longitudinal direction. Accordingly, the cutting direction is affected by this directivity when the leather is sewed to produce chairs, clothes, bags or the like, and large quantities of waste cuttings are also produced. In addition, the efficiency of the cutting work drops due to the directivity. The finished products are not free from problems, either, in that the strength of the ground fabric is low especially in the transverse direction and the products are easy to break or to undergo deformation and have short service life as a whole. Particularly when the leather is applied to so-called "heavy application" where it is subjected to a heavy load such as a seat for a motorcar, these problems occur more remarkably.

Creases are likely to develop at the sewed portions and the sewing efficiency drops.

SUMMARY OF THE INVENTION

Accordingly, an object of the present invention is to obtain a leather for a motorcar having a structure in which elongation and righting moment in the transverse direction are equal to those in the longitudinal direction, by using a knitted fabric, which is knitted in a specific way, as the ground fabric and by applying considerable pre-stress at the time of working.

The synthetic resin leather for a motorcar in accordance with the present invention is characterized in that a knitted fabric in a plurality of strokes is used as the ground fabric, and while slight tensile force is being applied to the fabric in the longitudinal direction, a soft synthetic resin layer is integrated with the fabric on its one surface. The plural strokes-knitted fabric may be either plain stitch or double stitch.

DESCRIPTION OF THE PREFERRED EMBODIMENT

One preferred embodiment of the present invention will be now described with reference to the drawings.

Figure 1:
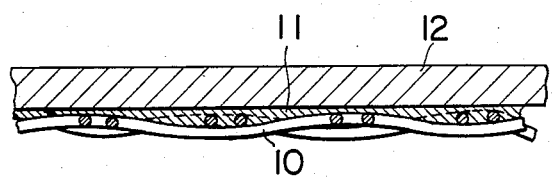
FIG. 1 is an enlarged sectional view of a synthetic leather in accordance with the present invention.

In FIG. 1, reference numeral 10 represents a knitted fabric which is knitted by plain stitch in a plurality of strokes and which is used as the ground fabric. Reference numeral 11 represents an adhesive layer applied to the surface of the ground fabric, and reference numeral 12 represents a soft synthetic resin layer which is bonded or heat-fused to one surface of the ground fabric and integrated with it.

Any materials can be used as the yarns for pluristroke knitted fabric of plain stitch so long as they do not get embrittled by heat and chemicals when bonded or heat-fused to the synthetic resin which is applied to the ground fabric. From the aspect of cost, however, rayon is effective, and from the aspect of strength, polyester is recommended.

Figure 2:
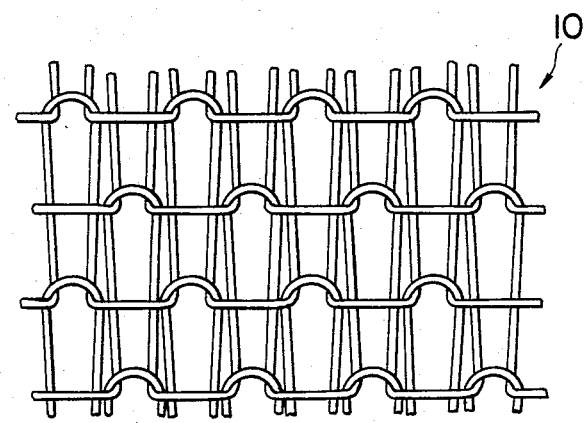
FIGS. 2 and 3 are plan views, each showing different examples of a ground fabric.
Figure 3:
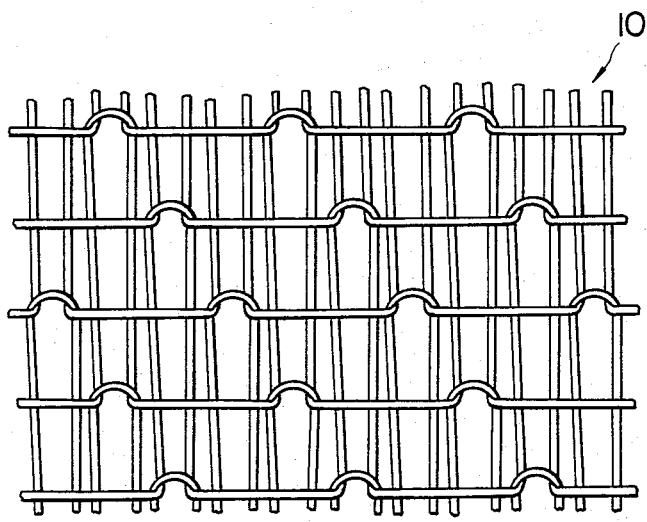

The ground fabric 10 of plain stitch can be knitted by double stroke as shown in FIG. 2, by triple stroke as shown in FIG. 3 and by quadruple stroke which is not shown in the drawing.

The soft synthetic resin layer can be applied with the highest workability to the ground fabric by forming a fused resin film, which is shaped by a calendar or a T die, on one surface of the ground fabric 10. However, an existing film may be bonded to the ground fabric using a laminator or the like.

The following is an example of the method of producing the leather in accordance with the present invention. First, a synthetic resin adhesive 11 is applied to one surface of the ground fabric 10 as an undercoating paste by a transfer method, and the undercoating paste is then heat-dried to solidify.

Next, the synthetic resin heated and fuse-rolled by a calendar as a typical example is sequentially press-rolled onto the ground fabric 10 having undercoating adhesive 11 between press rollers at the lower part of the calendar, and is then cooled to form a synthetic resin layer 12.

After desired printing is made on the surface of this synthetic resin layer, embossing of leather-like and fabric-like patterns is applied to obtain a product.

Elongation of the ground fabric in the longitudinal direction occurs inevitably when the fabric advances inside each machine at the time of bonding of the synthetic resin film to the ground fabric, at the time of printing work or at the time of embossing work, and this occurs not only in the embodiment described above but also in the production of synthetic leathers in general. Accordingly, inherent elongation of the ground fabric 10 in the longitudinal direction is reduced while its elongation in the transverse direction is promoted, so that the strength in the longitudinal direction increases while the strength in the transverse direction decreases.

Next, the tensile strength and elongation ;percentage of only the ground fabric 10 are illustrated with reference to the following Experimental Examples.

EXPERIMENTAL EXAMPLE 1

Test was carried out in accordance with JISK-6772 (vinyl leather cloth). The ground fabric 10 was made of rayon yarns of No. 20 count. However, No. 20 count polyester yarns were used in one stroke among triple stroke knitted fabric.

The result was shown in Table 1.

TABLE 1

| | Knitted fabric as ground fabric | Tensile Strength | | Elongation | |
|---|---|---|---|---|---|
| | | L* | T* | L* | T* |
| Ground fabric of this invention | Plain stitch- double stroke | 8.5 kg/3 cm | 18.8 kg/3 cm | 125% | 117% |
| | Plain stitch- triple stroke | 8.2 kg/3 cm | 15.3 kg/3 cm | 155% | 80% |
| Contrast | Plain stitch- | 7.0 | 4.7 | 76% | 166% |

TABLE 1-continued

| Knitted fabric as ground fabric | Tensile Strength L* | T* | Elongation L* | T* |
| --- | --- | --- | --- | --- |
| single stroke | kg/3 cm | kg/3 cm | | |
| Double stitch-single stroke | 23.4 kg/3 cm | 14.6 kg/3 cm | 27.5% | 149.4% |

*L: Longitudinal direction
*T: Transverse direction

EXPERIMENTAL EXAMPLE 2

A foamed leather was produced by bonding a soft polyvinyl chloride layer on the ground fabric 10 described above.

The soft polyvinyl chloride layer was composed of a foamed layer containing a foaming agent and a surface layer. The foamed layer was foamed after it was bonded to the surface layer. It had a structure ratio of 0.5 m/m of the foamed layer and 0.15 m/m of the surface layer, and the overall thickness including the ground fabric was 1.0 m/m. The foamed leather was subjected to the same test as in Experimental Example 1, with the result shown in Table 2.

TABLE 2

| | Knitted fabric as ground fabric | Tensile Strength L* | T* | Elongation L* | T* |
| --- | --- | --- | --- | --- | --- |
| Product of this invention | Plain stitch-double stroke | 13.9 kg/3 cm | 14.0 kg/3 cm | 68.6% | 75.3% |
| | Plain stitch-triple stroke | 25.0 kg/3 cm | 24.6 kg/3 cm | 85.8% | 85.8% |
| Contrast | Plain stitch-single stroke | 17.2 kg/3 cm | 12.2 kg/3 cm | 29.0% | 140.5% |
| | Double stitch-single stroke | 23.4 kg/3 cm | 14.6 kg/3 cm | 27.5% | 149.4% |

*L: Longitudinal direction
*T: Transverse direction

As can be understood from above, the leather in accordance with the present invention has remarkably improved tensile strength and elongation in both transverse and longitudinal direction in comparison with the conventional leather, and moreover, the tensile strength and elongation in the transverse direction are well balanced with those in the longitudinal direction. Especially because the elongation are averaged, the leather of the present invention does not undergo collapse of the shape when applied to a seat of a motorcar which is subjected to the repetition of heavy load, the occurrence of creases at the sewed portion becomes less, and no limit is imposed on the cutting direction of the fabric, thus reducing the waste of the fabric.

Since the ground fabric 10 of the plural stroke knitted fabric is employed, a leather having especially high tensile force can be obtained if yarns having high strength such as polyester yarns or nylon yarns are used in one of the plurality of strokes. Moreover, yarns having high resilience can also be used.

If those yarns are employed in one of the plurality of strokes which shrink upon heating or wet-heating during general finish work after the product is finished, the fabric can be stabilized under the curved state or can be turned into a fabric having a large number of delicate creases.

What is claimed is:

1. A synthetic leather comprising a base fabric knitted by a plurality of strokes, a synthetic resin lagyer bonded to one side of the base fabric, and an adhesive layer bonding the base fabric to the resin layer.

2. The synthetic leather claimed in claim 1 wherein the plural strokes is double, triple or quadruple stroke.

3. The synthetic leather claimed in claim 1 wherein said synthetic resin layer is shaped on one surface of the ground fabric by a calendar or a T die.

4. The synthetic leather claimed in claim 1 wherein said soft synthetic resin layer is selected from an unfoamed layer, a foamed layer, and a compound layer comprising a foamed layer and a surface layer formed on said foamed layer.

* * * * *